No. 867,739. PATENTED OCT. 8, 1907.
C. MERRITT.
CONVEYER SYSTEM.
APPLICATION FILED AUG. 18, 1906.
3 SHEETS—SHEET 2.
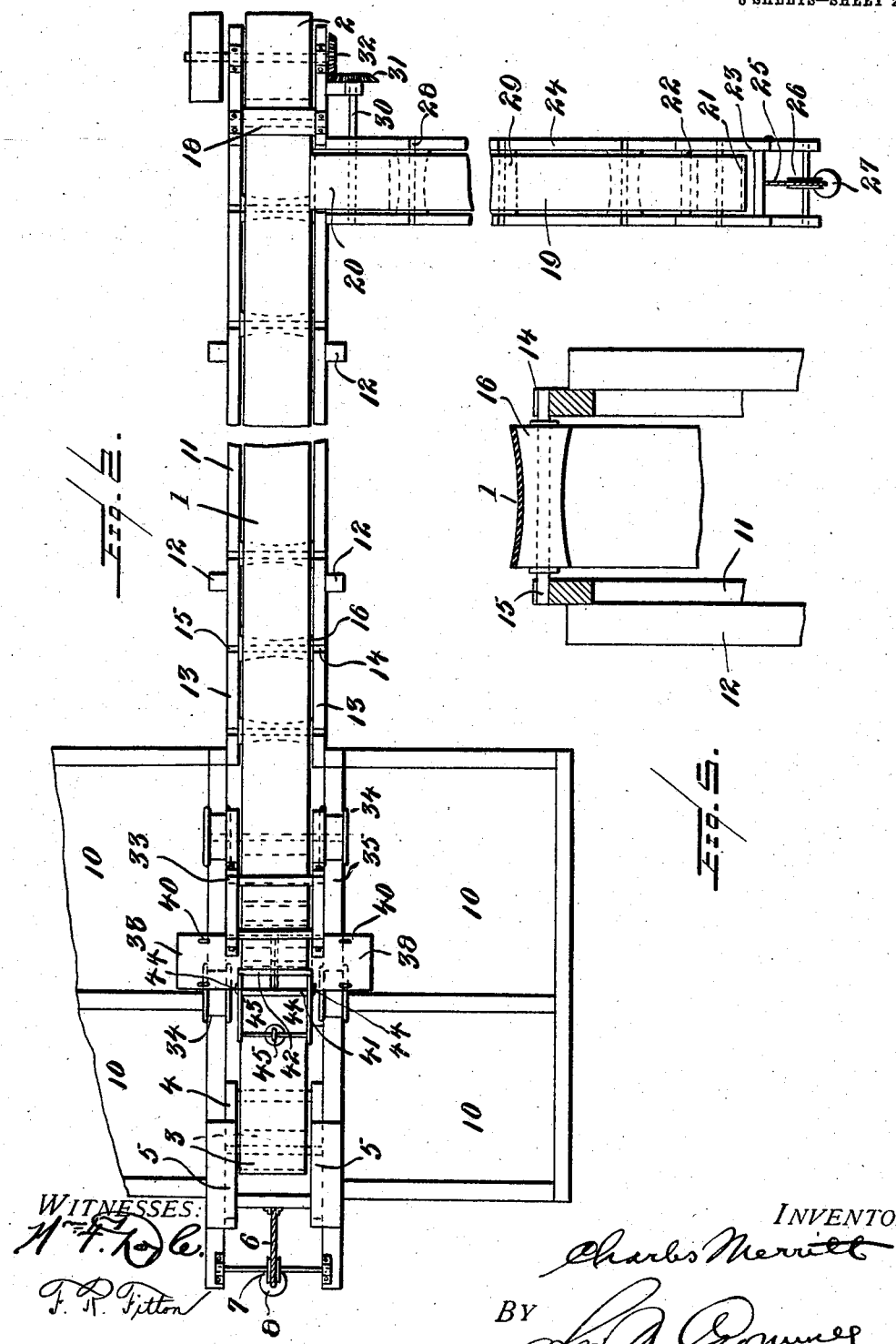
WITNESSES:
INVENTOR
Charles Merritt
BY
Attorney No. 867,739. PATENTED OCT. 8, 1907.
C. MERRITT.
CONVEYER SYSTEM.
APPLICATION FILED AUG. 18, 1906.
3 SHEETS—SHEET 3.
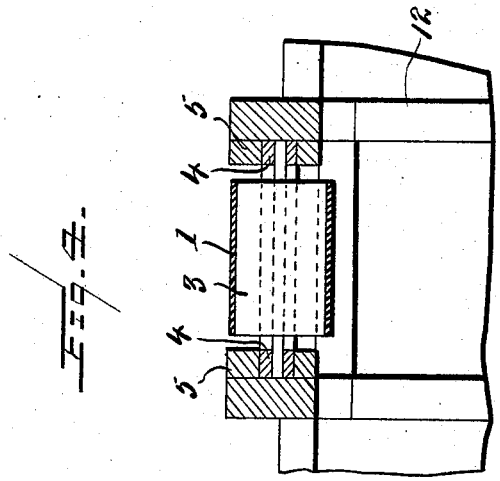
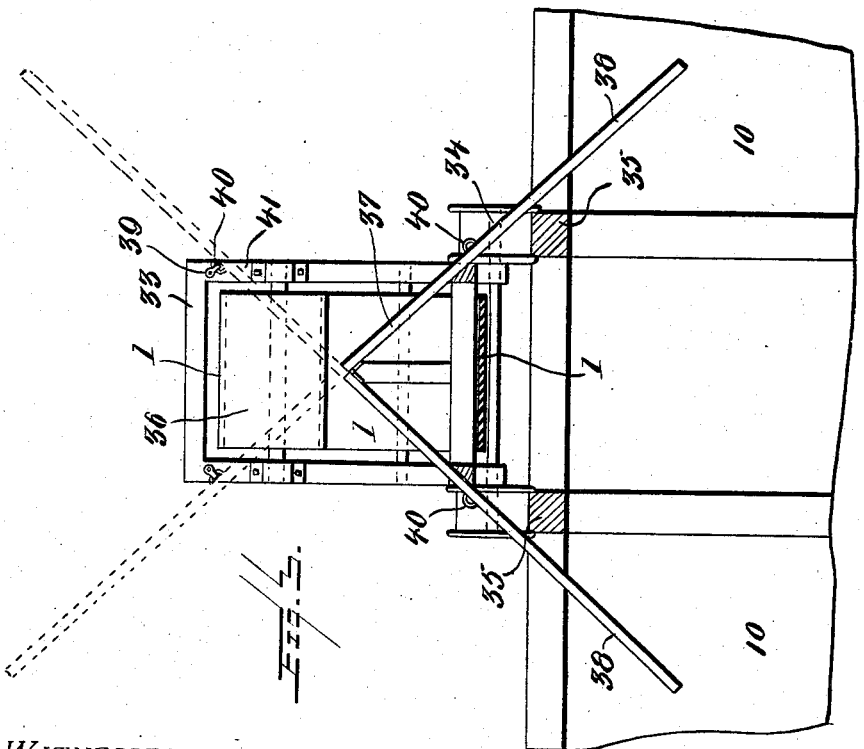

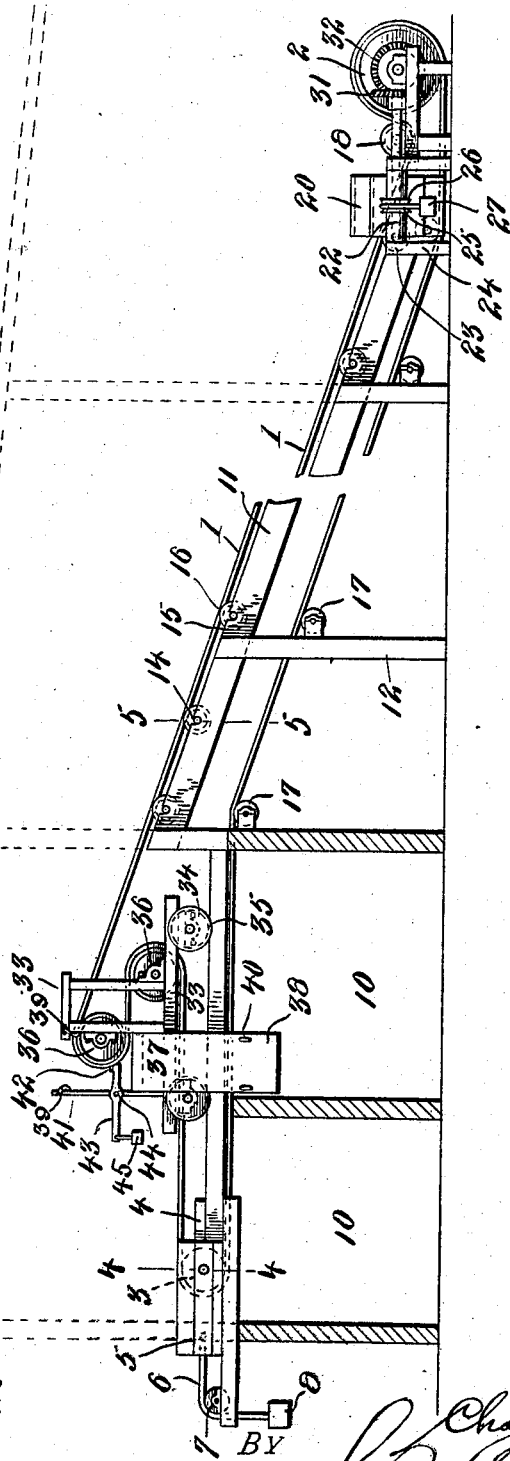

UNITED STATES PATENT OFFICE.

CHARLES MERRITT, OF POMEROY, OHIO.

CONVEYER SYSTEM.

No. 867,739.      Specification of Letters Patent.      Patented Oct. 8, 1907.

Application filed August 18, 1906. Serial No. 331,155.

*To all whom it may concern:*

Be it known that I, CHARLES MERRITT, a citizen of the United States, residing at Pomeroy, in the county of Meigs and State of Ohio, have invented certain new and useful Improvements in Conveyer Systems; and I do hereby declare the following to be a full, clear, and exact description of the invention, such as will enable others skilled in the art to which it appertains to make and use the same.

This invention relates to improvements in conveyer systems.

The object of the present invention is the provision of a conveyer system designed primarily for use in transferring and storing material in bulk, such as salt, coal, grain, etc., and to the accomplishment of this end the invention consists substantially in the novel construction, combination and arrangement of parts hereinafter fully described, illustrated in the accompanying drawings, and pointed out in the appended claims.

In the drawings—Figure 1 is a side elevation of a conveyer system constructed in accordance with the present invention. Fig. 2 is a top plan view thereof. Fig. 3 is a transverse sectional view of the adjustable delivery carriage and the track upon which it travels. Fig. 4 is a similar view on the line 4—4, Fig. 1. Fig. 5 is also a transverse sectional view on the line 5—5, Fig. 1.

Referring in detail to the drawings, the numeral 1 designates an endless conveyer, the latter being of the usual type, said conveyer passing around a power wheel or drum 2, which latter is connected to a suitable source of power for driving the conveyer. The conveyer 1, at an elevated point, also passes around a tension wheel or drum 3, the latter being journaled at a point in proximity to the locations at which it is desired to discharge the material carried by the conveyer, but said wheel or drum 3 is journaled in a frame 4 which latter is mounted to slide in guideways 5, and connected to the frame 4 is a cable 6 which passes over a sheave 7. To said cable is connected a weight 8, whereby the wheel or drum 3 is caused to impart to the conveyer 1 the desired degree of tension to permit the conveyer readily working. It will be noted at this point, however, that the drum 3, as shown in the drawings, is mounted in a store-house 9, which store-house is provided with a plurality of bins 10, and these bins are designed to receive the material carried by the conveyer as the same is discharged from the latter, but which will be more fully described hereinafter.

An inclined way 11 is suitably supported, as by standards 12, at a point throughout the major portion of the conveyer 1, said way comprising parallel members 13, and formed in the upper edges of the members 13 is a series of notches or recesses 14 in which are located the journals 15 of a plurality of supporting rolls 16. It will be noted that the rolls 16 are concave so that as the conveyer 1 passes therealong, and is weighted by the material thereon, the conveyer will conform to the shape of the rolls 16, thus imparting to the upper side of the conveyer a trough-like shape, and preventing the material being displaced from the sides thereof. Journaled at the underside of the inclined way 11 is a series of guide rolls 17, which rolls support the underside of the conveyer as the latter returns to the power wheel or drum 2, and consequently sagging of the underside of the conveyer is thereby prevented. An idler wheel or drum 18 is also journaled in proximity to the power wheel or drum 2, the purpose of which is to depress the upper side of the conveyer 1 into close relation with the supporting rolls 16, and at the same time to cause a greater portion of the periphery of the drum 2 to be enveloped by the conveyer, and thus obtain a maximum amount of the driving power imparted to the drum 2.

Arranged at substantially right angles to the conveyer 1 is a transfer or feed conveyer 19. This conveyer passes around a wheel or drum 20 that is mounted in close proximity to the lower end of the inclined way 11, while at the other end of the conveyer is a tension wheel or drum 21. The wheel or drum 21, like the tension wheel or drum 3, is journaled in a frame 22 that slides in parallel guides 23, the latter being connected to a supporting table 24 that extends beneath the upper side of the conveyer 19. A cable 25 is also connected to the frame 22, which cable passing around a sheave 26 is provided at its extremity with a weight 27, so that under the influence of the weight 27 the frame 22 will slide in the guides 23, and thus cause the wheel or drum 21 to properly tension the conveyer 19.

The table 24 has journaled at its upper side a series of supporting rolls 28, and guide rolls 29 are likewise arranged beneath the underside of the conveyer to support the latter as it returns from the drum 20 to the tension drum 21. It is to be observed, however, that the upper side of the conveyer 19 is in a higher plane than the upper side of the conveyer 1, and consequently the material carried by the conveyer 19 is readily discharged therefrom over the drum 20 and upon the conveyer 1 to be carried by the latter to one of the bins 10 for deposit therein. A shaft 30, upon which the drum 20 is secured, is provided with a bevel gear 31 that engages a similar gear 32, and the latter is carried by the shaft of the drum 2, so that power is transmitted from the shaft of the latter through the gears 31 and 32 to the drum 20 for operating the conveyer 19.

An adjustable delivery carriage 33 is employed for directing the material into the bins 10, the purpose of adjustably arranging this carriage being to enable the material discharging first into one bin, and then into another, in accordance with the character of the material conveyed, or the conditions prevailing within the respective bins. This carriage 33 is provided with supporting wheels 34, the latter being designed to travel upon tracks 35 arranged at a point above the bins 10, and journaled upon the framework of the carriage 33 is a pair of diagonally-arranged idler drums 36, said drums being in different horizontal planes, the conveyer 1 passing around the drums 36, and thus providing a point for the convenient discharge of the material from the conveyer 1. This is afforded by the upper drum 36, and it will be seen that as the conveyer 1 passes around said drum the material carried by the conveyer will readily fall therefrom. To direct the discharge of the material a sectional folding chute 37 is employed. This chute comprises two members 38 the upper ends of which are hingedly connected, and when both of the latter are in discharging position the chute assumes a substantially inverted V-shape. This chute is suitably supported upon the frame of the carriage 33, and by reason of the hinged connection of the members thereof either may be elevated to the position shown in dotted lines in Fig. 3, and thus the material will discharge only upon that side which is depressed. If, however, both are in the lowered position the material discharged by the conveyer will divide and pass down both of the members 38 into different bins. Suitable hooks 39 and eyes 40 are employed for sustaining the members 38 in their elevated position, but any other fastening devices may be employed, the hooks 39 being carried by an apron or guard 41 arranged in advance of the upper drum 36, and thus it will be seen that the material discharged from the conveyer 1 will be prevented passing beyond the apron or guard and compelled to pass down the chute 37. The hooks 39 are also carried by the frame of the carriage.

A scraper 42, preferably formed of rubber, is mounted upon a frame 43, which latter has a detachable connection with the guard 41, as by means of pins 44, which pins form a fulcrum upon which the frame 43 will swing, and for urging the scraper 42 into contact with the upper drum 36 and the conveyer 1 as it passes around said drum, a weight 45 is connected to the outer end of the frame 43, which weight causes a close contact of the scraper 42 with said conveyer. The sides of the frame 43 occupy positions at the edges of the apron or guard 41, and the latter therefore constitutes a support for the frame.

In the operation of the herein-described conveyer power is applied to the shaft of the drum 2 in any convenient manner, which drum causes the conveyer 1 to travel along the inclined way 11, around the drums 36, the conveyer traversing the tension drum 3, and passing back to the power drum 2. Simultaneously with the actuation of the drum 2 the drum 20 is also operated, whereby motion is imparted to the transfer or feed conveyer 19, and hence the material placed upon the latter is carried forward thereby and deposited upon the conveyer 1. This conveyer carries the material up the inclined way 11, and when the material on the conveyer reaches the upper drum 36 the same passes over this drum and becomes deposited upon the chute 37. Manifestly, the material will descend the chute 37 and in accordance with the position of the latter in relation to the bins 10, the material will be discharged into these bins. By reason of the conveyer 1 passing around the drums 36, and the delivery carriage 33 being mounted to travel upon the tracks 35, this carriage may be readily moved along said tracks without the expenditure of any great effort on the part of the operator, and thus the delivery carriage may be positioned opposite to any of the bins into which it is desired to transfer the material. The fact that the conveyer 1 passes around the tension drum 3, and the latter being controlled by the weight 8, it is also obvious that said tension drum will move under the influence of the movement of the delivery carriage, and at the same time maintain the proper tension to the conveyer 1 necessary for the proper operation thereof. When such material as salt and fine particles are being carried by the conveyer 1 the scraper 42 acting upon the surface of the conveyer frees the salt from engagement with the conveyer so that none of the material will return to the drum 2, but under the influence of the scraper the same is freed therefrom and deposited upon the chute 37. The tension drum 21 of the transfer or feed conveyer likewise tensions this latter conveyer, and under the influence of the weight 27 its proper operation is also assured.

Having thus described the invention, what is claimed as new, and desired to be secured by Letters Patent, is:—

1. In a system of the class described, a conveyer, means for actuating the same, a delivery carriage associated with said conveyer for discharging at different points the material carried thereby, and a sectional folding chute mounted upon said delivery carriage to discharge the material at either side or simultaneously at both sides of the delivery carriage.

2. In a system of the class described, a conveyer, means for actuating the same, a delivery carriage adjustably mounted in relation to said conveyer for discharging at different points the material carried thereby, a sectional folding chute mounted upon said delivery carriage to discharge the material at either side or simultaneously at both sides of the delivery carriage, and means for tensioning said conveyer to permit adjustment of the delivery carriage.

3. In a system of the class described, a conveyer, means for actuating the same, a delivery carriage associated with said conveyer, and an inverted V-shaped sectional folding chute associated with said carriage for directing the discharge of the material from the carriage, at either side or simultaneously at both sides thereof.

4. In a system of the class described, a conveyer, means for actuating the same, a delivery carriage adjustably mounted in relation to said conveyer for discharging at different points the material carried thereby, means for tensioning said conveyer to permit adjustment of the delivery carriage, and an inverted V-shaped sectional folding chute associated with said carriage for directing the discharge of the material from the carriage, at either side or simultaneously at both sides thereof.

5. In a system of the class described, a conveyer, means for actuating the same, a delivery carriage associated with said conveyer for discharging at different points the material carried thereby, an inverted V-shaped sectional folding chute mounted upon said delivery carriage to discharge the material at either side or simultaneously at both sides of the delivery carriage, and a transfer or feed conveyer arranged in proximity to said conveyer and discharging upon the latter.

6. In a system of the class described, a conveyer, means for actuating the same, a delivery carriage associated with said conveyer for discharging at different points the material carried thereby, a chute mounted upon the delivery carriage formed of sections disposed in opposite relation and hingedly connected to each other, whereby the material may be discharged at either side or simultaneously at both sides of the delivery carriage, a transfer or feed conveyer arranged in proximity to said conveyer and discharging upon the latter, and means for tensioning the transfer or feed conveyer.

7. In a system of the class described, a conveyer, means for actuating the same, a plurality of bins, supporting tracks arranged at an elevated point in proximity to said bins, a delivery carriage mounted upon said tracks and adapted to travel thereon for discharging within the respective bins the material carried by said conveyer, and a chute mounted upon the delivery carriage formed of sections disposed in opposite relation and hingedly connected to each other, whereby the material may be discharged at either side or simultaneously at both sides of the delivery carriage.

8. In a system of the class described, a conveyer, means for actuating the same, a plurality of bins, supporting tracks arranged at an elevated point in proximity to said bins, a delivery carriage mounted upon said tracks and adapted to travel thereon for discharging within the respective bins the material carried by said conveyer, a sectional folding chute associated with said carriage for directing the discharge of the material from the carriage, and means for holding the sections of said chute in elevated position.

9. In a system of the class described, a conveyer, means for actuating the same, a plurality of bins, supporting tracks arranged at an elevated point in proximity to said bins, a delivery carriage mounted upon said tracks and adapted to travel thereon for discharging within the respective bins the material carried by said conveyer, a sectional folding chute associated with said carriage for directing the discharge of the material from the carriage, means for holding the sections of said chute in elevated position, and a transfer or feed conveyer arranged in proximity to said conveyer and discharging on the latter.

10. In a system of the class described, a conveyer, means for actuating the same, a delivery carriage associated with said conveyer for discharging at different points the material carried thereby, a chute associated with said conveyer for directing the discharge of the material from the carriage, and an apron or guard also associated with said carriage to insure the material discharged from the conveyer passing upon said chute.

11. In a system of the class described, a conveyer, means for actuating the same, a delivery carriage associated with said conveyer for discharging at different points the material carried thereby, a chute associated with said conveyer for directing the discharge of the material from the carriage, an apron or guard also associated with said carriage to insure the material discharged from the conveyer passing upon said chute, and a scraper associated with said apron or guard and coacting with the conveyer for cleaning the latter of the material carried thereby.

12. In a system of the class described, a conveyer, means for actuating the same, a delivery carriage associated with said conveyer for discharging at different points the material carried thereby, a chute associated with said conveyer for directing the discharge of the material from the carriage, an apron or guard also associated with said carriage to insure the material discharged from the conveyer passing upon said chute, a scraper associated with said apron or guard and coacting with the conveyer for cleaning the latter of the material carried thereby, and means for holding said scraper in close contact with the conveyer.

In testimony whereof I affix my signature, in the presence of two witnesses.

CHAS. MERRITT.

Witnesses:
 CHAS. EBERSBECH,
 W. H. OWENS.